W. H. PRATT.
FREQUENCY INDICATOR.
APPLICATION FILED SEPT. 19, 1911.

1,076,448.

Patented Oct. 21, 1913.

Witnesses:
Earl G. Klock.
J. Ellis Glen

Inventor:
William H. Pratt,
by Davis
His Attorney.

UNITED STATES PATENT OFFICE.

WILLIAM H. PRATT, OF WEST LYNN, MASSACHUSETTS, ASSIGNOR TO GENERAL ELECTRIC COMPANY, A CORPORATION OF NEW YORK.

FREQUENCY-INDICATOR.

1,076,448.

Specification of Letters Patent.

Patented Oct. 21, 1913.

Application filed September 19, 1911. Serial No. 650,226.

*To all whom it may concern:*

Be it known that I, WILLIAM H. PRATT, a citizen of the United States, residing at West Lynn, county of Essex, State of Massachusetts, have invented certain new and useful Improvements in Frequency-Indicators, of which the following is a specification.

My invention relates to instruments for indicating the frequency of alternating current circuits and its object is to provide an indicator which is highly sensitive over the small range of frequency variation on which such instruments are ordinarily required to operate.

I obtain the desired result by providing one of the two relatively movable elements of the instrument with two windings exerting opposing forces on the other element and tuning the circuits of the two windings for two different frequencies above and below the average frequency to be indicated. For instance, if the average frequency of a circuit is sixty cycles, one winding may be tuned for 65 and the other for 55 cycles. With such an adjustment, currents in the two windings at 60 cycles may be caused to produce balanced forces but a small variation in frequency above or below 60 cycles will produce a rapid increase in the amount of current in one winding and a decrease in the current in the other winding, so that the opposing forces of the two windings will be unbalanced by a large amount. This means that wide deflections may be obtained with small variations in frequency or, in other words, that the instrument is highly sensitive.

My invention will best be understood by reference to the accompanying drawings in which—

Figure 1:
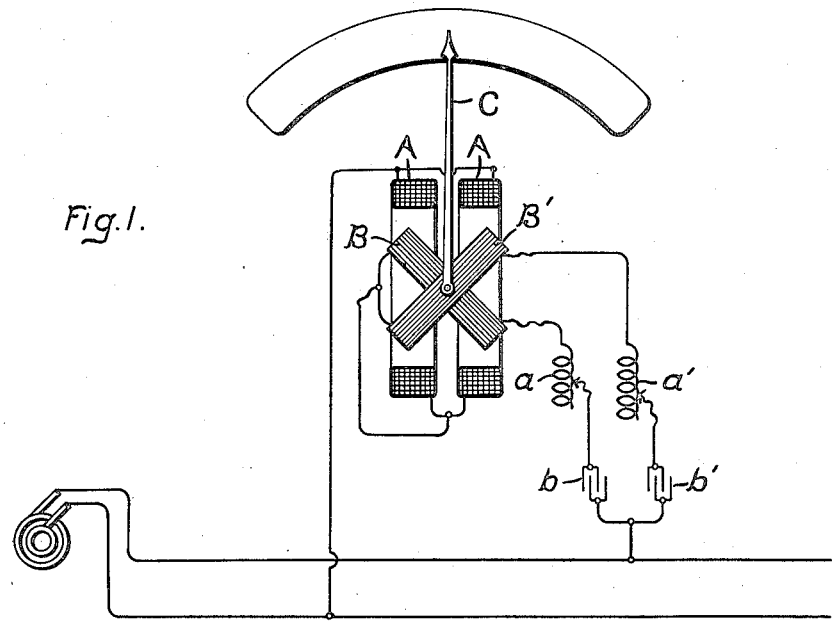
Figure 2:
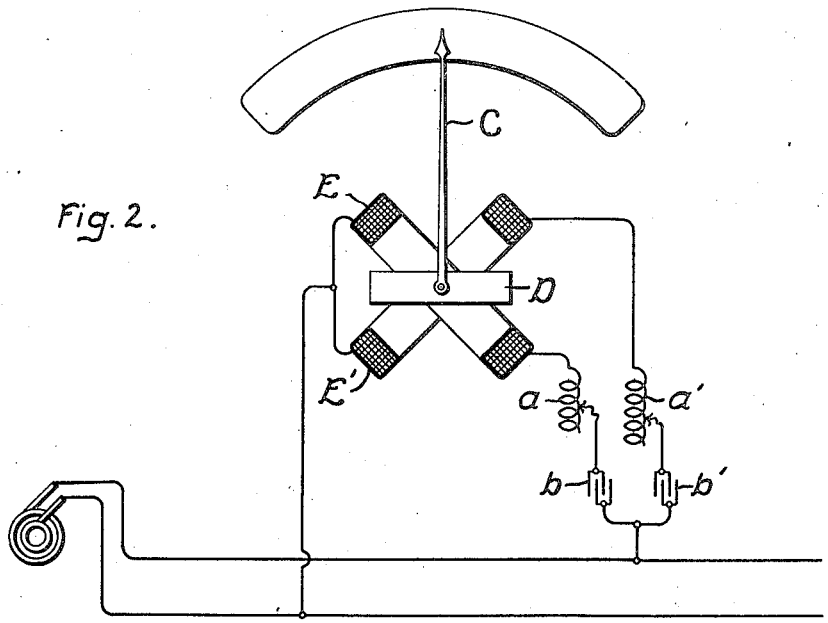

Figure 1 shows diagrammatically a frequency meter arranged in accordance with my invention; Fig. 2 shows a modified form of the meter.

In Fig. 1, A A represent two coils forming the stationary winding or a stationary element of the meter. B B' represent two windings constituting the movable element of the meter, which is pivotally mounted and carries the needle or indicator C. These windings are connected in parallel with each other and in series with the stationary element. Included in the parallel circuits in series with the coils B B' are devices for tuning the circuits to a given frequency. These devices are represented by reactances a a' and condensers b b'. The relative amount of reactance and capacity in the two parallel circuits is preferably adjustable as is indicated diagrammatically by the adjustable contacts in connection with the reactances. By means of these devices the circuits of windings B B' are tuned for different frequencies, the circuit of winding B being tuned for a higher frequency than that of winding B' as is indicated by the smaller amount of reactance in the circuit of winding B. If the instrument is designed to operate on 60 cycles as its average frequency, the circuit of winding B may be tuned for 65 cycles and that of B' for 55 cycles. Thus at 60 cycles currents in the two windings may be made approximately equal but will differ by large amounts when the frequency varies two or three cycles either side of 60. The windings B B' are placed at an angle to each other and connected so as to exert opposing forces on the stationary coils A A. Thus at 60 cycles the coils exert balanced forces and the indicator C carried by the movable element occupies a central position. As the frequency rises or falls, one coil or the other exerts a predominating effect and the indicator C is moved in one direction or the other.

Another arrangement of a frequency meter is shown in Fig. 2. In this modification, the movable element D comprises simply a bar of iron while the stationary element comprises two coils E E' mechanically displaced from each other and exerting opposing forces on the armature D. The circuits of these windings E E' are tuned for different frequencies in the same way that the windings B B' are tuned in the arrangement of Fig. 1.

I do not desire to limit myself to the particular construction and arrangement of parts shown and described, but aim, in the appended claims, to cover all modifications which are within the scope of my invention.

What I claim as new and desire to secure by Letters Patent of the United States, is,

1. A frequency indicator comprising relatively movable elements, one of said elements including two windings exerting opposing forces on the other element, means for tuning the circuits of the two windings for two different frequencies, an indicator actuated by the movable element, and a scale coöperating with said indicator.

2. A frequency indicator comprising relatively movable elements, one of said elements including two windings exerting opposing forces on the other element, means for tuning the circuits of the two windings for two different frequencies, said two frequencies being respectively above and below the average frequency to be measured, an indicator actuated by the movable element, and a scale coöperating with said indicator.

3. A frequency indicator comprising relatively movable elements, one of said elements including two windings exerting opposing forces on the other element, means for tuning the circuits of the two windings for two different frequencies, said two frequencies being respectively above and below the average frequency to be measured and differing therefrom by a small fraction of the average frequency, an indicator actuated by the movable element, and a scale coöperating with said indicator.

4. A frequency indicator comprising relatively movable elements, one of said elements including two windings exerting opposing forces on the other element, means for tuning the circuits of the two windings for different frequencies comprising a reactance and a condenser in series with each of said two windings, an indicator actuated by the movable element, and a scale coöperating with said indicator.

5. A frequency indicator comprising relatively movable elements, one of said elements including two windings exerting opposing forces on the other element, a reactance and a condenser in series with each of said two windings, means for adjusting the relative amounts of said reactances and condensers, an indicator actuated by the movable element, and a scale coöperating with said indicator.

6. A frequency indicator comprising three windings, two of said windings being relatively fixed with regard to each other and relatively movable with respect to the third winding and arranged to exert opposing forces on the third winding, means for tuning the circuits of the two relatively fixed windings for two different frequencies, and an indicator actuated by one of said windings.

7. A frequency indicator comprising relatively movable elements, one of said elements including two windings placed at an angle to each other and connected so as to exert opposing forces on the other element, means for tuning the circuits of the two windings for two different frequencies, an indicator actuated by the movable element, and a scale coöperating with said indicator.

8. A frequency indicator comprising a stationary element and a movable element, said movable element including two windings exerting opposing forces on the stationary element, means for tuning the circuits of the two windings for two different frequencies, and indicating means actuated by the movable element.

9. A frequency indicator for indicating the frequency of an alternating current comprising relatively movable elements, one of said elements including two windings connected to the source of said alternating current and placed at an angle to each other and connected so as to exert opposing forces on the other element, means for tuning the circuits of the two windings for two different frequencies, said two frequencies being respectively above and below the average frequency to be measured, an indicator actuated by the movable element, and a scale coöperating with said indicator for indicating the frequency of said alternating current.

10. A frequency indicator for indicating the frequency of an alternating current comprising a stationary element and a movable element, said movable element comprising two coils placed at an angle to each other and connected in parallel with one another and in series with the stationary element, means for tuning the circuits of the two coils for different frequencies comprising a condenser in series with each coil of the movable element, and indicating means actuated by said moving element for indicating the frequency of said alternating current.

In witness whereof, I have hereunto set my hand this sixteenth day of September 1911.

WILLIAM H. PRATT.

Witnesses:
 JOHN A. MCMANUS, Jr.,
 WM. A. MAYOR.